United States Patent
Liu et al.

(10) Patent No.: US 9,986,460 B1
(45) Date of Patent: May 29, 2018

(54) ADJUSTING ACKNOWLEDGMENT TRANSMISSIONS BASED ON CARRIER AGGREGATION

(71) Applicant: Sprint Spectrum L.P., Overland Park, KS (US)

(72) Inventors: Chunmei Liu, Great Falls, VA (US); Pratik Kothari, Sterling, VA (US); Hemanth B. Pawar, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 306 days.

(21) Appl. No.: 14/702,622

(22) Filed: May 1, 2015

(51) Int. Cl.
*H04L 12/26* (2006.01)
*H04W 28/06* (2009.01)
*H04L 5/00* (2006.01)
*H04L 5/06* (2006.01)
*H04W 72/04* (2009.01)
*H04L 29/06* (2006.01)

(52) U.S. Cl.
CPC ............ *H04W 28/06* (2013.01); *H04L 5/001* (2013.01); *H04L 5/06* (2013.01); *H04L 69/16* (2013.01); *H04W 72/0406* (2013.01); *H04W 72/0453* (2013.01)

(58) Field of Classification Search
CPC ... H04L 1/0007; H04L 1/0026; H04L 1/0029; H04L 1/1671; H04L 1/1861; H04L 5/0055; H04L 12/6418; H04L 5/003; H04L 5/006; H04L 5/001; H04L 69/16; H04W 28/06; H04W 72/0406

USPC ....... 370/280, 311, 329, 338, 230, 231, 235, 370/252; 709/232
See application file for complete search history.

(56) References Cited

U.S. PATENT DOCUMENTS

| 6,622,172 B1 | 9/2003 | Tam | |
|---|---|---|---|
| 7,925,775 B2 * | 4/2011 | Nishida | H04L 1/0007 709/232 |
| 2012/0082145 A1 * | 4/2012 | Chen | H04L 1/0029 370/338 |

(Continued)

OTHER PUBLICATIONS

Afifi et al., "A Dynamic Delayed Acknowledgment Mechanism to Improve TCP Performance for Asymmetric Links," Third IEEE Symposium on Computers and Communications, ISCC, 1998, 5 pages.

(Continued)

*Primary Examiner* — Harun Chowdhury

(57) ABSTRACT

Carrier aggregation may occur in wireless networks when multiple carriers from either contiguous frequency bands or non-contiguous frequency bands are aggregated together as component carriers. Wireless computing devices (WCDs) may use these aggregated component carriers as a single, logical channel for wireless communication. Such a WCD may determine that an amount of carrier aggregation used by a wireless interface of the WCD has increased. The WCD may receive data packets from a correspondent device by way of the wireless interface, and the WCD may transmit, in response to receiving the data packets, acknowledgment packets to the correspondent device by way of the wireless interface. Possibly based on the amount of carrier aggregation increasing, the WCD may reduce an extent of the acknowledgment packets transmitted to the correspondent device.

20 Claims, 9 Drawing Sheets

(56) References Cited

U.S. PATENT DOCUMENTS

2015/0341945 A1* 11/2015 Panchal ................. H04L 5/003
                                                           370/329
2016/0218850 A1*  7/2016 Gross ..................... H04L 5/006
2016/0302197 A1* 10/2016 Xie ..................... H04L 12/6418

OTHER PUBLICATIONS

Balakrishnan et al., "TCP Performance Implications of Network Path Asymmetry," Network Working Group, Best Current Practice, Dec. 2002, 41 pages.

Kalampoukas et al., "Improving TCP Throughput over Two-Way Asymmetric Links: Analysis and Solutions," ACM Sigmetrics Performance Evaluation Review 26.1, 1998, pp. 78-89.

Koga, Hisashi, "Dynamic TCP acknowledgment with sliding window," Theoretical Computer Science, 2009, pp. 914-925, vol. 410.

Lakshman et al., "Window-based error recovery and flow control with a slow acknowledgment channel: a study of TCP/IP performance," INFOCOM'97. Sixteenth Annual Joint Conference of the IEEE Computer and Communications Societies. Driving the Information Revolution., Proceedings IEEE, 1997, 11 pages, vol. 3.

Landström et al., "Reducing the TCP Acknowledgement Frequency," AGM SIGCOMM Computer Communication Review, Jul. 2007, pp. 7-16, vol. 37, No. 3.

* cited by examiner

ADJUSTING ACKNOWLEDGMENT TRANSMISSIONS BASED ON CARRIER AGGREGATION

BACKGROUND

Wireless networks may provide packet-based services to wireless computing devices (WCDs). For example, a radio access network (RAN) may define one or more wireless coverage areas through which the WCDs may obtain wireless communication services from the RAN. A particular WCD may communicate with the RAN via one or more of the RAN's base stations. In order to make this communication more efficient, for example, the RAN may assign one or more uplink and/or downlink channels to the WCD. Doing so, however, can cause a disruption in communication between the WCD and other devices.

OVERVIEW

In a wireless communication system, a base station may provide one or more wireless coverage areas, such as cells or sectors, through which the base station may serve WCDs. These WCDs may include cell phones, wirelessly-equipped personal computers or tablets, tracking devices, embedded wireless communication modules, or other devices equipped with wireless communication functionality (whether or not operated by a human user).

In general, each wireless coverage area may operate on one or more carrier frequencies, and may form respective downlink channels for carrying communications from the base station to WCDs and respective uplink channels for carrying communications from the WCDs to the base station. Such carrier frequencies may be frequency-division duplex (FDD), in which pairs of downlink and uplink channels are defined as separate respective ranges of frequency, or time-division duplex (TDD), in which the downlink and uplink channels are defined on a common range of frequencies, but distinguished from one another through time-division multiplexing. Further, downlink channels and uplink channels may also be divided into respective sub-channels for carrying particular communications, such as one or more control channels for carrying control signaling and one or more traffic channels for carrying bearer traffic.

For instance, in a system operating according to an orthogonal frequency-division multiple access (OFDMA) protocol, such as the Long Term Evolution (LTE) standard of the Universal Mobile Telecommunications System (UMTS), the air interface is divided over time into frames and sub-frames. Each sub-frame defines two time slots, and the uplink and downlink channels are each divided frequency-wise into sub-carriers that are grouped into resource blocks within each time slot. When a WCD is positioned within coverage of a base station in such a system, the WCD may register or "attach" with the base station on a particular carrier frequency, and the base station may then schedule particular downlink and uplink resource blocks on that carrier frequency to carry data communications to and from the WCD. Further, the base station and WCD may modulate their air interface data communications at a coding rate selected based on quality of the WCD's coverage, such as with higher rate coding rate when the WCD is in better coverage of the base station and with a lower coding rate when the WCD is in worse coverage of the base station.

In such an LTE system, for instance, when the base station has data to transmit to a WCD, the base station may assign certain downlink resource blocks (and thus certain sub-carriers) in a particular sub-frame to carry the data to the WCD at a particular coding rate. The base station may then (i) in that sub-frame, transmit to the WCD a downlink control information (DCI) message that specifies the assigned resource blocks and coding rate, and (ii) encode and transmit the data to the WCD in the assigned resource blocks of the sub-frame. Per the DCI message, the WCD would then read the transmitted data from the assigned resource blocks.

Likewise, when the WCD has data to transmit to the base station and accordingly transmits a scheduling request to the base station, the base station may assign certain uplink resource blocks in a given sub-frame to carry the data from the WCD at a particular coding rate. The base station may then transmit to the WCD, in advance of that sub-frame, a DCI message that specifies the assigned resource blocks and coding rate. The WCD may then encode and transmit the data to the base station in the assigned resource blocks in that sub-frame.

With such an arrangement, the bandwidth of the carrier frequency on which the base station serves a WCD may pose an effective limit on the peak rate of data communication between the base station and the WCD. For instance, the bandwidth might define only a limited number of resource blocks per slot, with the data rate per resource block being further limited based on air interface conditions. By way of example, in accordance with the LTE standard, the spectrum associated with an FDD carrier frequency may be up to 20 MHz wide. Depending on the FDD frame format (e.g., how many sub-frames per frame are used for downlink versus uplink) and other factors, such a carrier frequency may accommodate peak downlink data rate of only 60 megabits per second (Mbps).

One way to help overcome this per-carrier-frequency data rate limitation is to have a base station serve a WCD on multiple carrier frequencies at once, providing what is known as a "carrier aggregation" service. With carrier aggregation, multiple carriers from either contiguous frequency bands or non-contiguous frequency bands are aggregated together as "component carriers." This may increase the overall bandwidth available per slot by providing a greater extent of air interface resources in which the base station can schedule uplink and downlink communication from and to the WCD. For instance, if a base station serves a WCD on two 20 MHz FDD LTE downlink channels at once, the peak throughput may be about 120 Mbps. If the base station serves a WCD on three 20 MHz FDD LTE downlink channels at once, the peak throughput may be as high as 180 Mbps. With carrier aggregation, one of the carrier frequencies may be deemed to be a primary carrier frequency or primary cell (PCell) and each other carrier frequency may be deemed to be a secondary carrier frequency or secondary cell (SCell).

Carrier aggregation, however, generally increases the number of downlink carrier frequencies assigned to the WCD, and leaves the number of uplink carrier frequencies assigned to the WCD at one. Thus, the network capacity available to the WCD may be asymmetric, with the WCD able to receive data at a rate several times greater than the rate at which the WCD can transmit data.

In some situations, such an arrangement is beneficial, as it merely reflects the asymmetric nature of certain types of data communications. For instance, when the WCD is downloading large files, or streaming music or videos, the WCD will likely be receiving this data at a much greater rate than it transmits data. Nonetheless, as the extent of carrier aggregation increases, the uplink path can become a bottleneck for the WCD.

Some protocols executed by the WCD, such as the Transmission Control Protocol (TCP), instruct the WCD to transmit one acknowledgment packet to a sender for every one or two data packets that the WCD receives from the sender. While these acknowledgment packets are often short (e.g., containing header information with little or no application data), the rate at which the acknowledgment packets are transmitted can overload and congest an uplink channel, especially when multiple downlink carriers are aggregated.

But, if the acknowledgment packets are cumulative, in that a particular acknowledgment packet acknowledges all data received by the WCD so far on a given communication session, some acknowledgment packets can either be discarded, or not generated at all. The data packets that would have been acknowledged by these discarded or non-generated acknowledgment packets can still be acknowledged by subsequent acknowledgment packets. With such an arrangement, the number of acknowledgment packets transmitted by the WCD may decrease. Thus, congestion on uplink channels may also be decreased with little or no impact on the WCD's communication sessions.

Accordingly, in a first example embodiment, a WCD may determine that an amount of carrier aggregation used by a wireless interface of the WCD has increased. The WCD may receive data packets from a correspondent device by way of the wireless interface, and the WCD may transmit, in response to receiving the data packets, acknowledgment packets to the correspondent device by way of the wireless interface. Possibly based on the amount of carrier aggregation increasing, the WCD may reduce an extent of the acknowledgment packets transmitted to the correspondent device.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as aspects of one or more overall embodiments, with the understanding that not all illustrated features are necessary for each embodiment.

1. Example Wireless Communication System

Figure 1:
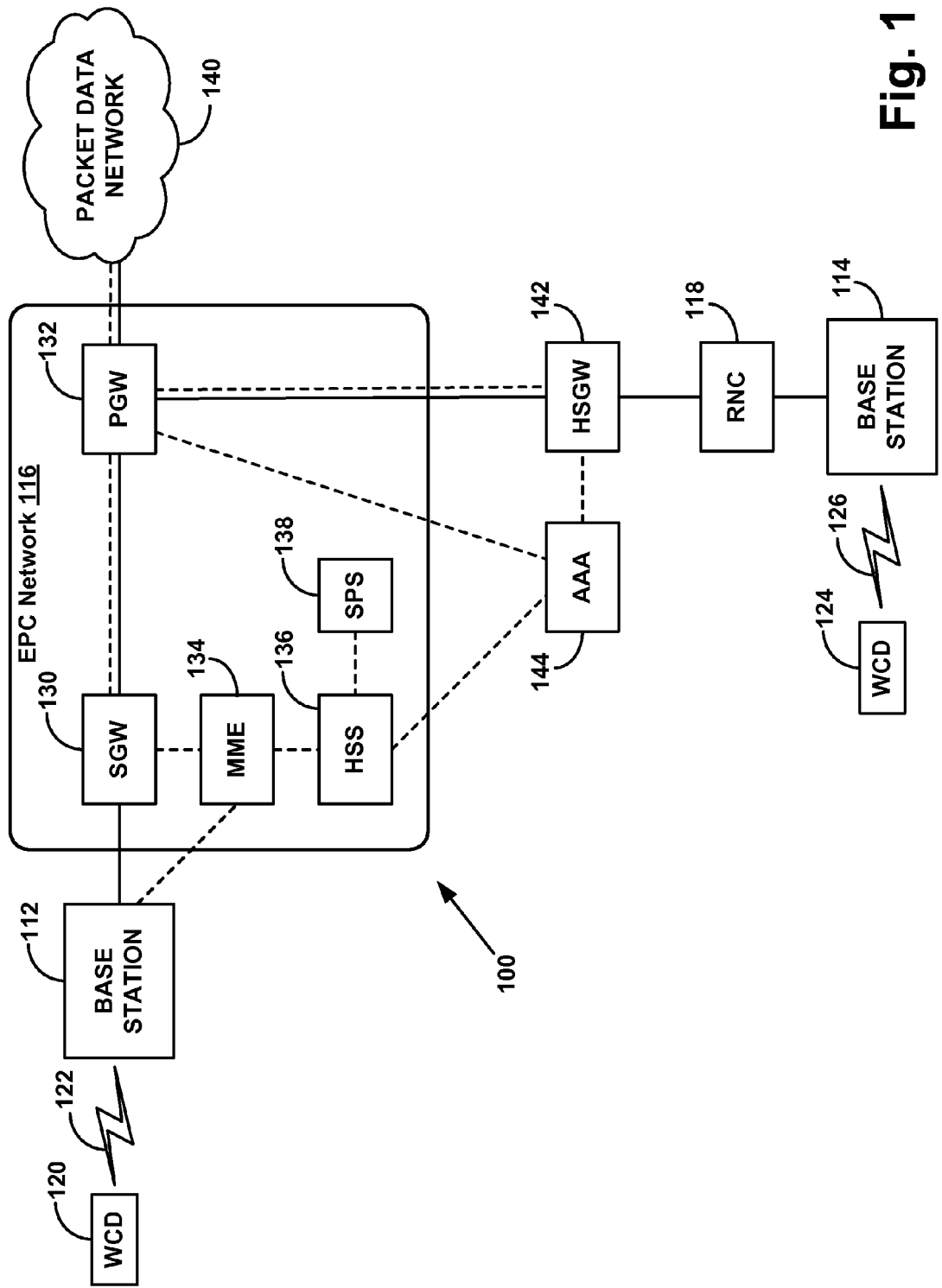
FIG. 1 is a block diagram of a wireless communication system, in accordance with example embodiments.

FIG. 1 illustrates example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved RAN that uses an Evolved Packet Core (EPC) network 116. Base station 114 is part of a legacy RAN that includes a radio network controller (RNC) 118. Base stations 112 and 114 each provide one or more respective wireless coverage areas through which the respective base stations can communicate with one or more WCDs. The wireless coverage areas provided by base stations 112 and 114 could be either overlapping or non-overlapping.

A WCD may be referred to as user equipment (UE). For instance, WCDs 120 and 124 could be wireless telephones, wirelessly-equipped handheld, tablet, or laptop computers, or any other type of WCD. Despite this nomenclature, a WCD need not be an end-user device, and may include various types of devices that have limited interactions with human users.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include downlink channels for communication from the RAN to WCDs, and uplink channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132. MME 134 may manage signaling traffic between base station 112 and various elements in EPC network 116, for example, relating to authentication of WCDs and activating and de-activating bearer connections for WCDs. HSS 136 may be configured to authenticate WCDs, as well as to access subscriber profiles stored in SPS 138. For example, SPS 138 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for web access, email, text, voice-over-IP (VoIP), video, streaming media, gaming, and/or other packet data services.

WCD 120 may engage in signaling with base station 112 to establish a radio-link-layer connection (i.e., air interface connection) on a particular carrier frequency, so that base station 112 may then serve WCD 120 on that carrier frequency. For instance, WCD 120 and base station 112 may exchange radio resource control (RRC) configuration messaging in order to prepare base station 112 to serve the WCD 120 on the carrier frequency, and to prepare WCD 120 to be served on the carrier frequency. In this process, base station 112 may store a context record for WCD 120, indicating that base station 112 is serving WCD 120 on the particular carrier frequency, so that base station 112 may then serve WCD 120 on the indicated carrier frequency (e.g., then exchanging signaling and bearer traffic with WCD 120 on that carrier frequency) per that context record. Further, WCD 120 may store a context record indicating that WCD 120 is being served on that carrier frequency, so that WCD 120 can then be served on that carrier frequency (e.g., then exchanging signaling and bearer traffic with base station 112 on that carrier frequency) per that context record. As such, the radio-link-layer connection could be considered to initially encompass just that one carrier frequency.

In addition, during this initial attach process and/or later while serving WCD 120, base station 112 and WCD 120 may engage in RRC configuration messaging and/or other processing to modify or otherwise set the radio-link-layer connection to encompass a different number of carrier frequencies. In particular, base station 112 and WCD 120 may arrange the radio-link-layer connection to encompass two or more carrier frequencies so as to facilitate a carrier aggregation service.

In addition, EPC network 116 may provide packet data connections to packet data network 140 for WCDs served by other RANs, such as WCDs served by legacy RANs. In the example shown in FIG. 1, wireless communication system 100 includes an HRPD serving gateway (HSGW) 142 that supports interworking between EPC network 116 and a legacy RAN, the latter exemplified in FIG. 1 by base station 114 and RNC 118. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various operations, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting. Moreover, various disclosed operations can be implemented by any combination of hardware, firmware, and/or software, such as by one or more processors programmed to execute computer instructions for instance.

2. Example Computing Device

Figure 2:
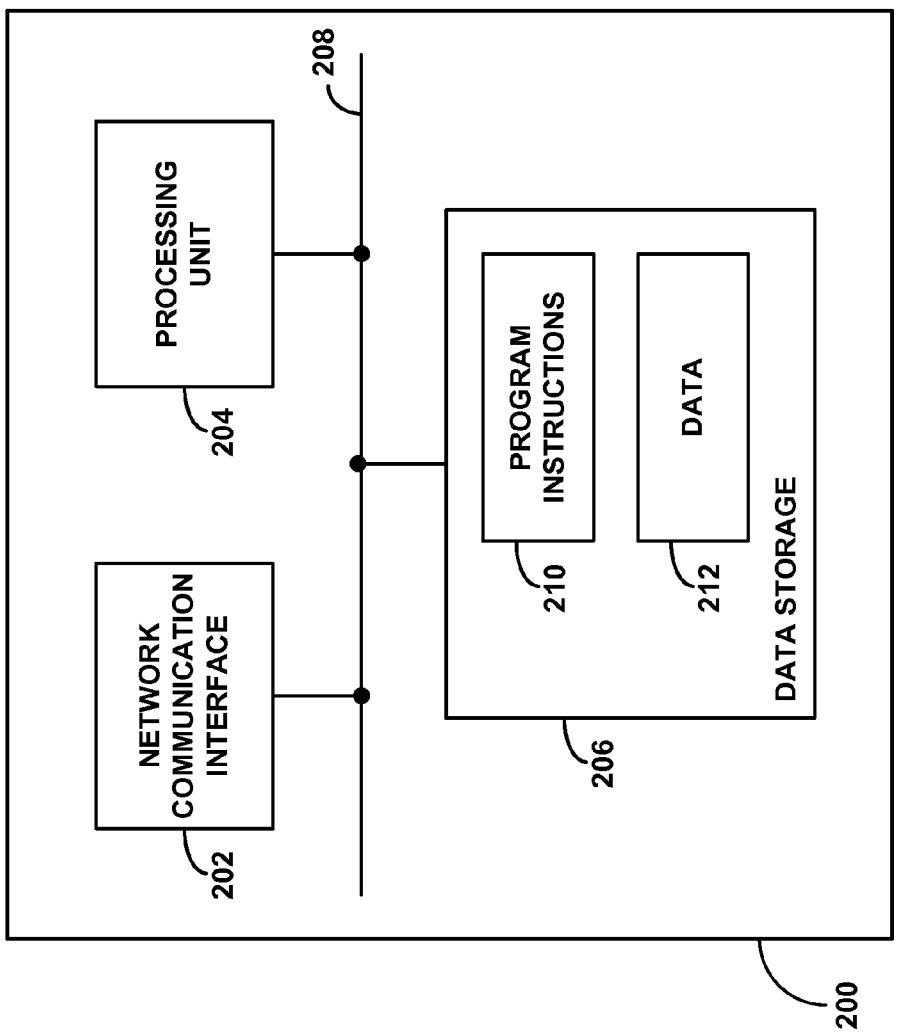
FIG. 2 is a block diagram of a computing device, in accordance with example embodiments.

FIG. 2 is a block diagram of example computing device 200. Computing device 200 could be a standalone general purpose or specialized computing device. Alternatively, computing device 200 could be a WCD or a part of the RAN. Thus, computing device 200 may represent a smartphone, tablet computer, personal computer, base station, MME, SGW, PGW, or some other type of computer or RAN component.

As shown, computing device 200 includes a network communication interface 202, a processing unit 204, and data storage 206, all of which may be communicatively linked together by a system bus, network, or other connection mechanism 208. Computing device 200 may also include additional components, operations, and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various operations described herein and/or depicted in the accompanying drawings. Data 212 could be any data that is generated, received, stored, or used in connection with carrying out such operations.

3. Carrier Aggregation

Carrier aggregation is an optional feature supported by some network technologies, such as LTE-Advanced. Carrier aggregation may be used to increase the wireless bandwidth, and thus the data rate, between a RAN and a WCD. Carrier aggregation may be enabled for both downlink and uplink channels, just for downlink channels, or just for uplink channels.

Carrier aggregation allows the RAN to assign, to a WCD, capacity from two or more carrier frequencies at the same time. Without carrier aggregation, the rate at which a WCD can receive data is limited by the WCD's assigned bandwidth, which is usually centered near the WCD's assigned carrier frequency. If the data that the RAN transmits on this carrier frequency is subject to distortion, interference, reflections, or attenuation, the effective data rate that the WCD obtains may be less than its theoretical maximum data rate.

However, if more than one carrier frequency is assigned to the WCD, the WCD may utilize bandwidth associated with each of these carrier frequencies. As a result, the WCD's theoretical maximum data rate can be increased. For instance, if three carrier frequencies are assigned to a WCD, the WCD's theoretical maximum data rate may be approximately tripled.

Along with increasing the WCD's theoretical maximum data rate, carrier aggregation is likely to also increase the WCD's effective data rate. Even if all of the assigned carrier frequencies are subject to some distortion, interference, reflections, or attenuation, the WCD's effective data rate is likely to be greater than if the WCD was assigned only one carrier frequency. Further, since wireless channel characteristics may be different for each frequency, with carrier aggregation, the WCD is more likely to be assigned at least one carrier frequency on which the signals received by the WCD are subject to less distortion, interference, reflections, or attenuation. Thus, when receiving data on this carrier frequency, the WCD may be able to achieve a high effective data rate.

For purposes of the discussion herein, the extent or amount of carrier aggregation may be interpreted as number of carrier frequencies assigned to the WCD. Thus, a carrier aggregation of one indicates that the WCD is assigned one carrier frequency, a carrier aggregation of two indicates that the WCD is assigned two carrier frequencies, and so on. Further, the same or a different extent or amount of carrier aggregation may be used in the downlink and uplink directions. Therefore, in some cases, a WCD may be assigned three carrier frequencies in the downlink direction, but only one carrier frequency in the uplink direction.

Figure 3A:
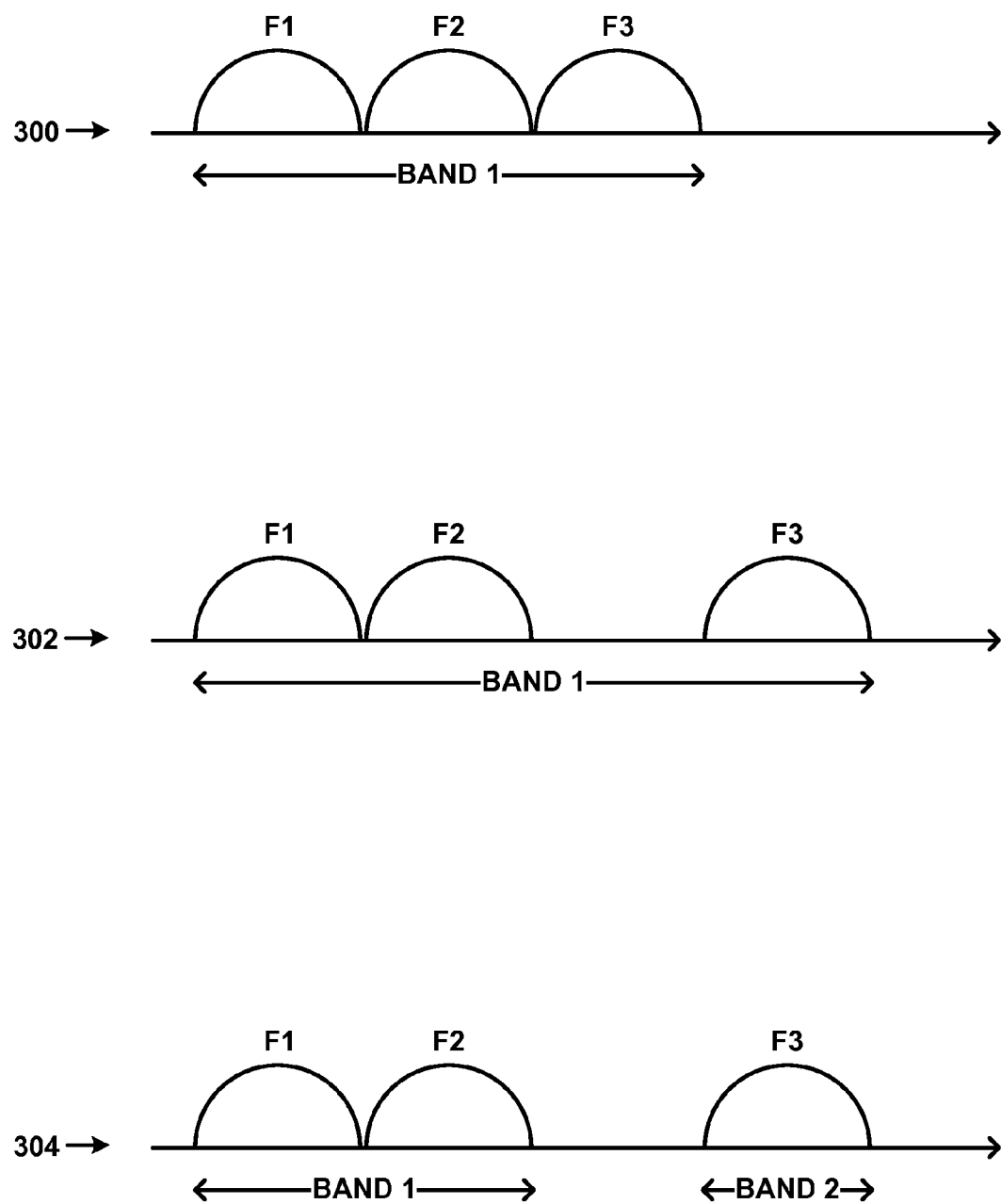
FIG. 3A illustrates various frequency arrangements for carrier aggregation, in accordance with example embodiments.

FIG. 3A illustrates three possible arrangements of carrier aggregation, in accordance with example arrangements. Each of these arrangements involve the aggregation of three carrier frequencies, but in practice the number of carrier frequencies aggregated may be two or more than three. Further, in FDD systems, the depicted carrier frequencies may include both a downlink frequency and an uplink frequency. FIG. 3A, however, does not illustrate separate downlink and uplink frequencies. Thus, carrier frequencies F1, F2, and F3 may each include distinct downlink and uplink frequencies. For instance, each carrier frequency may be the midpoint of a spectrum that possibly includes distinct uplink and downlink frequencies.

Arrangement 300 involves assignment, to a WCD, of three contiguous carrier frequencies (F1, F2, and F3) in the same band. Thus, the WCD may be able to treat these aggregated carrier frequencies as if they were a single enlarged channel. In this instance, the WCD may be able to use only one transceiver to transmit and receive data on all three carrier frequencies.

Arrangement 302 involves assignment, to a WCD, of at least some non-contiguous carrier frequencies in the same band. Carrier frequencies F1 and F2 are contiguous with one another, but F3 is not contiguous with either of F1 or F2. As such, the WCD might use two or more transceivers to transmit and receive data on all three carrier frequencies.

Similarly, arrangement 304 involves the assignment, to a WCD, of at least some non-contiguous carrier frequencies in different bands. Carrier frequencies F1 and F2 are contiguous with one another in band 1, but F3 is in band 2 and therefore not contiguous with either of F1 or F2. In this case as well, the WCD may use two or more transceivers to transmit and receive data on all three carrier frequencies.

When carriers are aggregated, each carrier frequency may be referred to as a component carrier frequency. Of the component carrier frequencies, one may be a primary carrier frequency (referred to as a PCell) and the others may be secondary carrier frequencies (referred to as SCells). The primary carrier frequency may be the carrier frequency that the WCD receives with the strongest signal. However, other factors may be taken into account as well, or instead of, signal strength when assigning a primary carrier frequency. The PCell and one or more SCells assigned to a particular WCD may be differentiated from one another with an index that takes on values from 0-7, for example. The index value of 0 may refer to the PCell and the remaining index values of 1-7 may each refer to an SCell.

In some embodiments, all signaling between the WCD and RAN can take place on the primary carrier frequency, while the primary and secondary carrier frequencies are used for data transmission. Nonetheless, implementations in which signaling takes place on one or more secondary carrier frequencies may be possible.

With carrier aggregation, each component carrier frequency may be used to define a different wireless coverage area. In order for the carrier frequencies from different wireless coverage areas to be used to transmit data to a particular WCD, these wireless coverage areas may overlap to some extent.

Figure 3B:
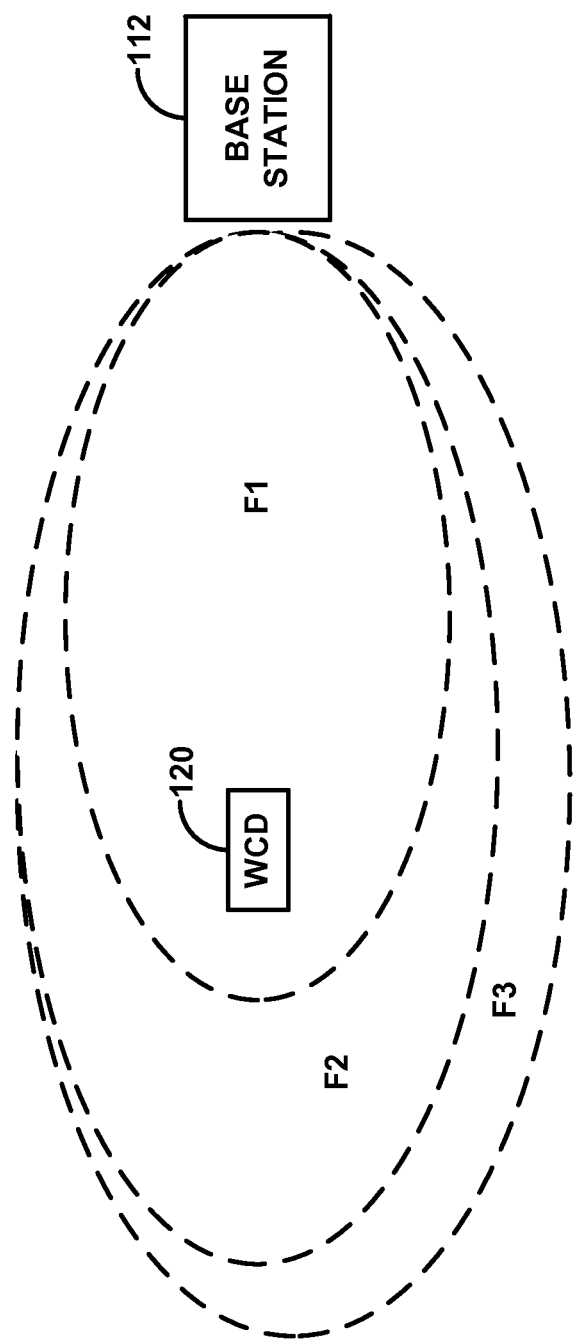
FIG. 3B depicts the coverage of several wireless coverage areas each defined by different carrier frequencies, in accordance with example embodiments.

FIG. 3B depicts the coverage of several wireless coverage areas each defined by different carrier frequencies. In FIG. 3B, base station 112 defines three wireless coverage areas defined by carrier frequencies F1, F2, and F3, respectively. Each of these wireless coverage areas provide progressively more coverage. The wireless coverage area defined by carrier frequency F2 provides a superset of the coverage provided by the wireless coverage area defined by carrier frequency F1. Likewise, the wireless coverage area defined by carrier frequency F3 provides a superset of the coverage provided by the wireless coverage area defined by carrier frequency F2. Other overlapping or partially overlapping sets of wireless coverage areas may also be used for carrier aggregation.

WCD 120 is located within the coverage of each of these wireless coverage areas. Thus, WCD 120 may be able to use carrier aggregation to communicate with base station 112 using one, two, or all three of these wireless coverage areas.

4. Example Network Protocol Stack Enhancements

Figure 4:
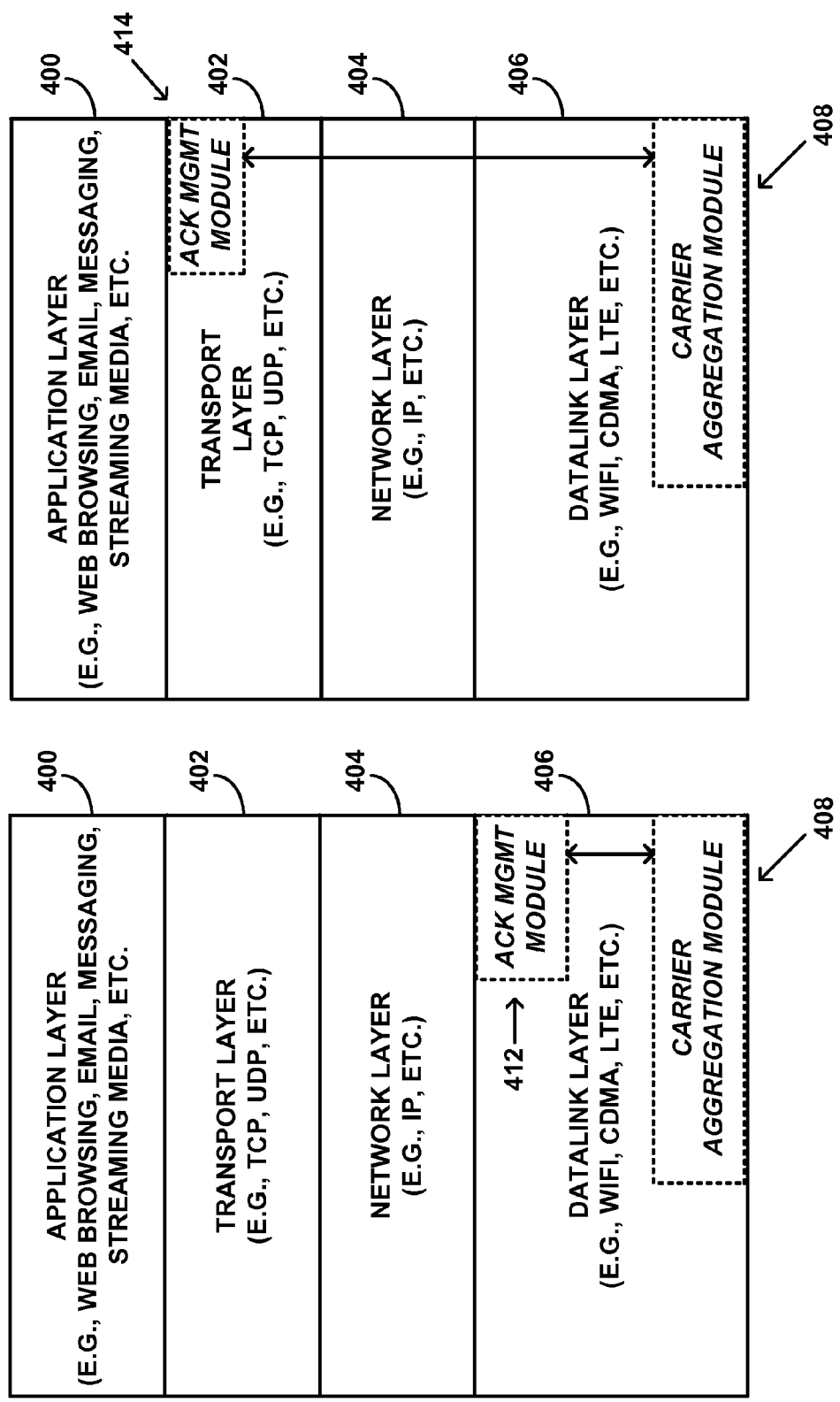
FIG. 4 depicts communication protocol stacks, in accordance with example embodiments.

FIG. 4 depicts a pair of example network protocol stacks. Both of these stacks consist of four layers, though more or fewer layers may be used in practice. Each stack is a separate example of a network protocol stack that maybe implemented in a WCD. Nonetheless, the stacks in FIG. 4, or the functionality thereof, can be combined in some embodiments.

Application layer 400 represents networked applications, such as (but not limited to) web browsing, email, messaging, and streaming media applications. These applications rely on the mechanisms of the lower layers (transport layer 402, network layer 404, and datalink layer 406) for communication services. However, the details of how these lower layers operate may be hidden, at least to some extent, from application layer 400.

Transport layer 402 represents an end-to-end communication layer that facilitates an application on one device communicating with a corresponding application on another device. Examples of transport layer protocols include TCP, the User Datagram Protocol (UDP), and other protocols. Some of these protocols attempt to provide reliable end-to-end transport of application data, while others do not.

Network layer 404 represents a hop-by-hop communication layer that provides forwarding, routing, and addressing features. An example of a network layer protocol is the Internet Protocol (IP), but other protocols may be used instead.

Datalink layer 406 represents a media-specific communication layer. Each network interface supported by a WCD (e.g., Wifi, CDMA, LTE, etc.) may have its own datalink layer module, though only one monolithic module is shown in FIG. 4. Nonetheless, datalink layer 406 may facilitate the transmission and reception of data and acknowledgment packets on these specific media. As such, data link layer 406 may carry out some or all of each medium's protocols, and may be able to read and set communication parameters for each medium.

In FIG. 4, datalink layer 406 contains carrier aggregation module 408. This module may manage carrier aggregation for a WCD. Thus, carrier aggregation module 408 may request, from a serving RAN, increased carrier aggregation when the WCD is receiving a high volume of data. Conversely, carrier aggregation module 408 may request, from the serving RAN, decreased carrier aggregation when the WCD is receiving no data or a low volume of data. Alternatively or additionally, other factors may influence the amount of carrier aggregation used by the WCD.

In FIG. 4, the network protocol stack on the left also includes an acknowledgment management module (ACK mgmt. module) 412. This module controls the extent of acknowledgment packets that the WCD transmits in response to receiving data packets. Since acknowledgment management module 412 resides in datalink layer 406, acknowledgment management module 412 may intercept acknowledgment packets generated, for example, by transport layer 402. Acknowledgment management module 412 may then determine which of these acknowledgment packets are to be transmitted, and which are to be discarded. By selectively discarding acknowledgment packets, acknowledgment management module 412 may be able to reduce the overall number of acknowledgment packets transmitted by the WCD. In doing so, acknowledgment bottlenecks caused by carrier aggregation may be mitigated or alleviated.

Similarly, the network protocol stack on the right also includes an acknowledgment management module (ACK mgmt. module) 414. This module may also control the extent of acknowledgment packets that the WCD transmits in response to receiving data packets. Since acknowledgment management module 414 resides in transport layer 402, acknowledgment management module 414 may limit the number of acknowledgment packets generated at this layer. As an example, if transport layer 402 is configured to transmit an acknowledgment packet for every one or two data packets received on a given communication session, acknowledgment management module 414 may change this value to 4, 8, 16, etc. In this way, acknowledgment management module 414 may also be able to reduce the overall number of acknowledgment packets transmitted by the WCD.

Both acknowledgment management module 412 and acknowledgment management module 414 may act in response to changes in carrier aggregation module 408. Thus, if the amount of carrier aggregation increases, acknowledgment management module 412 and acknowledgment management module 414 may take measures to reduce the number of transmitted acknowledgment packets. Conversely, if the amount of carrier aggregation decreases, acknowledgment management module 412 and acknowledgment management module 414 may take measures to increase the number of transmitted acknowledgment packets.

In particular, an increase in the amount of carrier aggregation may be an increase in the asymmetry of carrier aggregation at the WCD—e.g., the number of carrier frequencies assigned to the WCD for downlink communication may increase with respect to the number of carrier frequencies assigned to the WCD for uplink communication. Thus, in response to the ratio of downlink carrier frequencies to uplink carrier frequencies increasing, the WCD may transmit relatively fewer acknowledgment packets. On the other hand, in response to this ratio decreasing, the WCD may transmit relatively more acknowledgment packets.

In order to facilitate communication between carrier aggregation module 408 and either or both of acknowledgment management module 412 and acknowledgment management module 414, the network protocol stacks may support application program interfaces (depicted with arrows in FIG. 4) so that acknowledgment management module 412 and acknowledgment management module 414 may request and receive the current amount of carrier aggregation from carrier aggregation module 408. Acknowledgment management module 412 and acknowledgment management module 414 may request such information periodically or from time to time.

FIG. 4 depicts two different network protocol stacks, each with an acknowledgment management module in a different location and possibly performing slightly different functions. However, both of these acknowledgment management modules can be implemented in the same protocol stack, and thus may operate in conjunction with one another. Further, the functionality of acknowledgment management module 412 may be located in other layers of a network protocol stack, such as transport layer 402 or network layer 404, for instance.

5. Example Operations

Figure 5A:
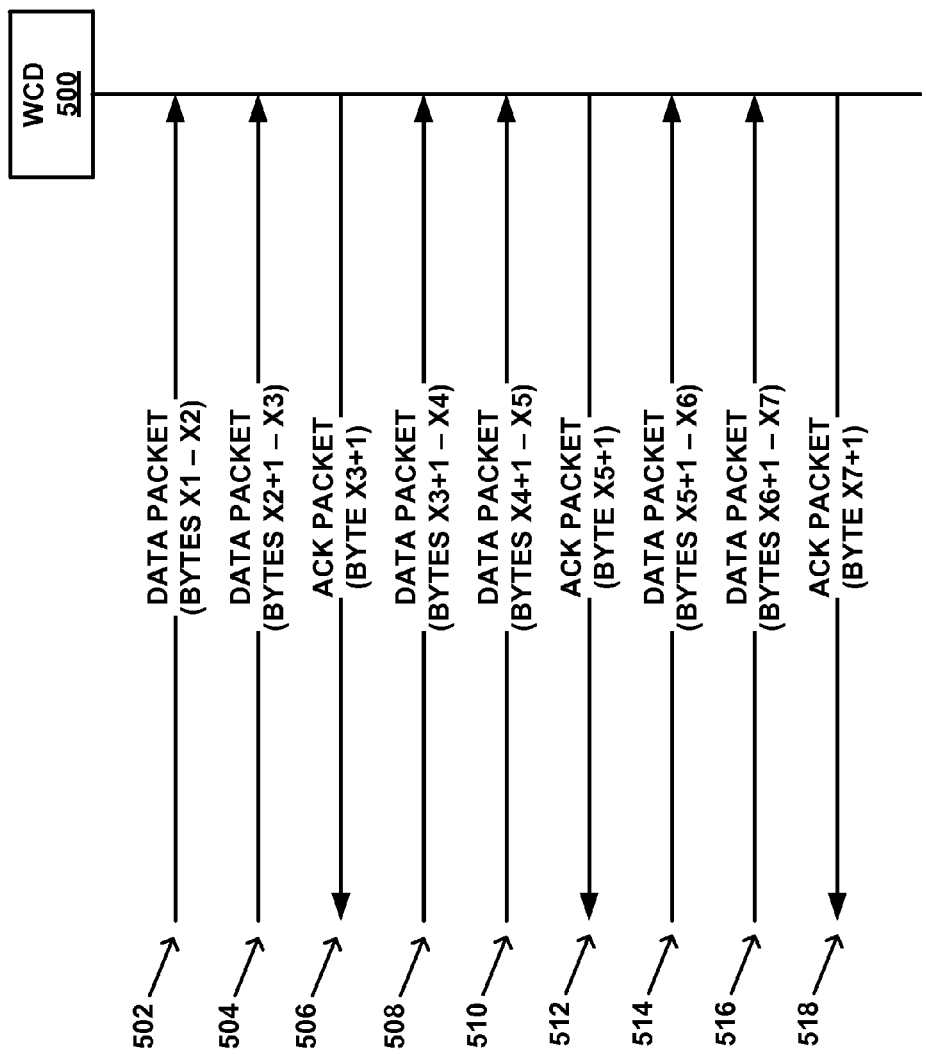
FIG. 5A depicts an example TCP session without adjusting the transmission of TCP acknowledgment packets, in accordance with example embodiments.
Figure 5B:
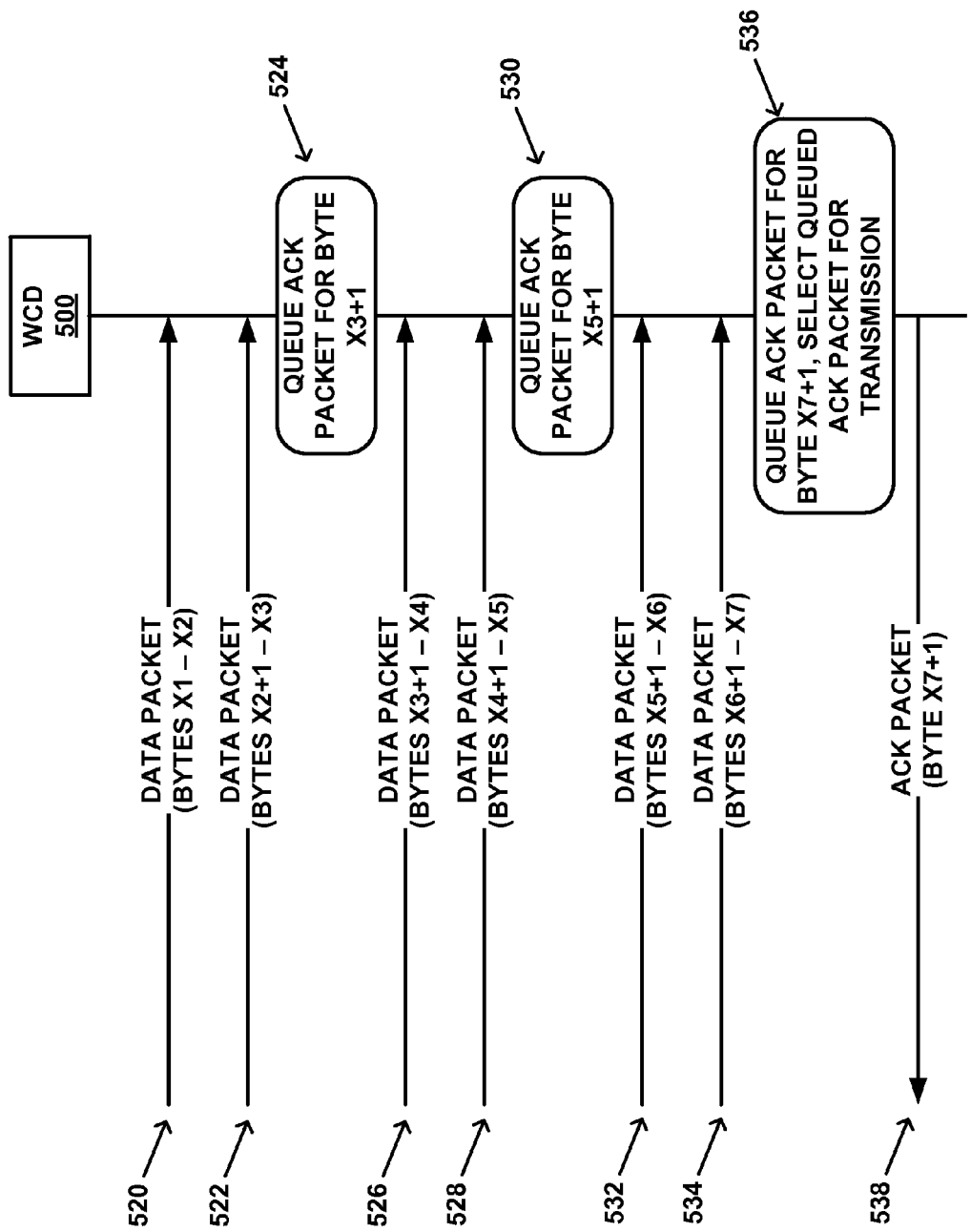
FIG. 5B depicts an example TCP session with adjusted transmission of TCP acknowledgment packets, in accordance with example embodiments.
Figure 5C:
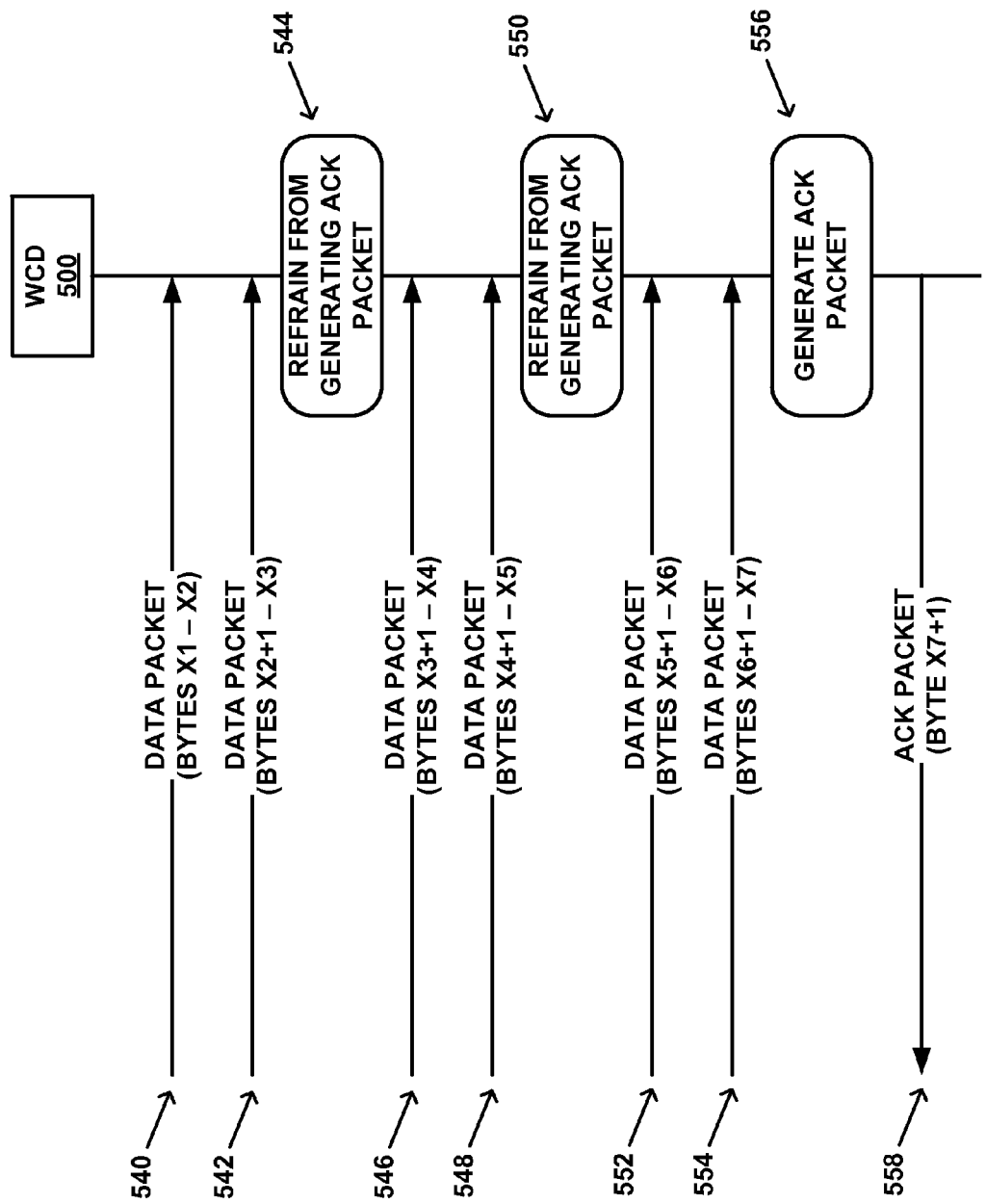
FIG. 5C depicts another example TCP session with adjusted transmission of TCP acknowledgment packets, in accordance with example embodiments.

FIGS. 5A 5B, and 5C depict aspects of the embodiments herein in further detail. In these figures, various TCP acknowledgment strategies based on carrier aggregation are illustrated for purposes of example. However, the embodiments herein may operate with protocols other than TCP.

TCP is a reliable, end-to-end protocol that operates on the transport layer of a network protocol stack. TCP is connection-oriented, in the sense that TCP connections are explicitly established and torn down. TCP includes mechanisms with which it can detect likely packet loss between a sender and recipient, and resend potentially lost data packets. TCP is also a modified sliding window protocol, in that only a limited amount of data may be transmitted by the sender before the sender receives an acknowledgment for at least some of this data from the recipient, and the sender may operate a congestion control mechanism to avoid flooding an intermediate network with an excessive amount of data.

TCP data packets and acknowledgment packets include TCP headers. These headers each contain a sequence number and acknowledgment number, representing bytes respectively transmitted and/or acknowledged by the participants in the TCP session. The sequence number may represent the relative offset of the next byte that the sender will transmit. The acknowledgment number may represent the sequence number of the next byte that the sender of acknowledgment number expects to receive. By using sequence and acknowledgment numbers, the participants in the TCP session can carry out TCP's sliding window protocol.

FIG. 5A illustrates an example TCP session that does not involve adjusted transmission of TCP acknowledgment packets based on carrier aggregation. In FIG. 5A, WCD 500 is shown exchanging communications with a correspondent device (not shown). In particular, WCD 500 and the correspondent device are engaged in a TCP session involving the correspondent device transmitting data packets to WCD 500, and WCD 500 is transmitting acknowledgment packets to the correspondent device. It is assumed that there is a nominal amount of carrier aggregation at WCD 500 (e.g., WCD 500 uses one downlink carrier frequency and one uplink carrier frequency).

In some cases, the TCP acknowledgment packets of FIG. 5A (as well as those of FIGS. 5B and 5C) may be "pure" acknowledgment packets. A pure acknowledgment packet contains only headers (e.g., TCP, IP and datalink headers), and no application data. However, other arrangements in which some or all of the acknowledgment packets contain application may be possible. Further, the examples shown in FIGS. 5A, 5B, and 5C all assume that WCD 500 transmits one acknowledgment packet for every two data packets that it receives.

At steps 502 and 504, WCD 500 receives data packets from the correspondent device. These TCP data packets each include a number of application data bytes. For instance, the data packet received at step 502 contains data bytes X1 through X2, and the data packet received at step 504 contains data bytes X2+1 through X3. TCP refers to bytes in a communication session using the sequence number and acknowledgment number fields, and chooses a pseudo-random number as the initial sequence number. Thus, for instance, if the data packet received at step 502 contained 1000 data bytes and the sequence number in the header of this data packet was 132452, then it could be inferred that the first data byte (X1) in this data packet was byte number 132452, and the last data byte (X2) in this data packet was byte number 133451.

At step 506, WCD 500 transmits an acknowledgment packet to the correspondent device. The acknowledgment number in the TCP header of this acknowledgment packet has a value of X3+1, which indicates that WCD 500 has received all data bytes up to and including X3, and expects to receive data byte X3+1 next.

At steps 508 and 510, WCD 500 receives two more data packets from the correspondent device. The data packet received at step 508 contains data bytes X3+1 through X4, and the data packet received at step 510 contains data bytes X4+1 through X5.

At step 512, WCD 500 transmits an acknowledgment packet to the correspondent device. The acknowledgment number in the TCP header of this acknowledgment packet has a value of X5+1, which indicates that WCD 500 has received all data bytes up to and including X5, and expects to receive data byte X5+1 next.

At steps 514 and 516, WCD 500 receives two more data packets from the correspondent device. The data packet received at step 514 contains data bytes X5+1 through X6, and the data packet received at step 516 contains data bytes X6+1 through X7.

At step 518, WCD 500 transmits an acknowledgment packet to the correspondent device. The acknowledgment number in the TCP header of this acknowledgment packet has a value of X7+1, which indicates that WCD 500 has received all data bytes up to and including X7, and expects to receive data byte X7+1 next.

FIG. 5B depicts an example TCP session with adjusted transmission of TCP acknowledgment packets based on carrier aggregation. In particular, this is the same TCP session as that of FIG. 5A, but a greater amount of carrier aggregation is used. Therefore, WCD 500 transmits relatively fewer acknowledgment packets.

At steps 520 and 522, WCD 500 receives data packets from the correspondent device. The data packet received at step 520 contains data bytes X1 through X2, and the data packet received at step 522 contains data bytes X2+1 through X3.

At step 524, rather than transmitting an acknowledgment packet that acknowledges the data received through data byte X3 and indicates that the next byte expected to be received is data byte X3+1, WCD 500 queues this acknowledgment packet. WCD 500 may wait until multiple acknowledgment packets are queued before transmitting one or more of these queued acknowledgment packets. In doing so, WCD 500 may reduce the number of acknowledgment packets transmitted per data packet.

At steps 526 and 528, WCD 500 receives two more data packets from the correspondent device. The data packet received at step 526 contains data bytes X3+1 through X4, and the data packet received at step 528 contains data bytes X4+1 through X5.

At step 530, WCD 500 queues another acknowledgment packet. This additionally-queued acknowledgment packet acknowledges that all data bytes through X5 have been received by WCD 500, and that the next expected data byte is X5+1.

At steps 532 and 534, WCD 500 receives two more data packets from the correspondent device. The data packet received at step 532 contains data bytes X5+1 through X6, and the data packet received at step 534 contains data bytes X6+1 through X7.

At step 536, WCD 500 once again queues an acknowledgment packet, this acknowledgment packet acknowledging that all data bytes through X7 have been received by WCD 500, and indicating that the next expected data byte is X7+1. At this point, WCD 500 has queued three acknowledgment packets. However, since TCP acknowledgments are cumulative, WCD 500 can transmit just the most-recently queued acknowledgment packet to effectively acknowledge all data bytes received so far on this communication session. The other queued acknowledgment packets that were not transmitted may be discarded.

Thus, at step 538, WCD 500 transmits the acknowledgment packet queued at step 536. As a result, instead of transmitting three acknowledgment packets, only one is transmitted, reducing the extent of transmitted acknowledgment packets by two-thirds. The operations depicted in FIG. 5B may take place, for instance, in acknowledgment management module 412 (at the data link layer), acknowledgment management module 414 (at the transport layer), or in a module located elsewhere in a network protocol stack or a WCD.

The behavior of WCD 500 may change between that of FIG. 5A and FIG. 5B based on changes in the amount of carrier aggregation used by WCD 500. The number of acknowledgment packets queued before transmission of one may vary from 2, to 4, 8, 16, etc., and this variability may also be based on the amount of carrier aggregation used by WCD 500. For instance, when the amount of carrier aggregation increases, WCD 500 may begin queuing acknowledgment packets, and the number of acknowledgment packets queued before transmission of one may increase with the amount of carrier aggregation. Conversely, when the amount of carrier aggregation decreases, WCD 500 may reduce the number of acknowledgment packets queued before transmission of one, or may stop queuing acknowledgment packets altogether.

In contrast to FIG. 5B, FIG. 5C depicts a WCD refraining from generating some acknowledgment packets. The TCP session shown in FIG. 5C is the same as that of FIG. 5A, but a greater amount of carrier aggregation is used. Therefore, WCD 500 transmits relatively fewer acknowledgment packets.

At steps 540 and 542, WCD 500 receives data packets from the correspondent device. The data packet received at step 540 contains data bytes X1 through X2, and the data packet received at step 542 contains data bytes X2+1 through X3. At step 544, WCD 500 refrains from generating an acknowledgment packet. Such an acknowledgment packet would have acknowledged all bytes received through data byte X3.

At steps 546 and 548, WCD 500 receives two more data packets from the correspondent device. The data packet received at step 546 contains data bytes X3+1 through X4, and the data packet received at step 548 contains data bytes X4+1 through X5. At step 550, WCD 500 again refrains from generating an acknowledgment packet. Such an acknowledgment packet would have acknowledged all bytes received through data byte X5.

At steps 552 and 554, WCD 500 receives two more data packets from the correspondent device. The data packet received at step 552 contains bytes X5+1 through X6, and the data packet received at step 554 contains bytes X6+1 through X7. At step 556, WCD 500 generates an acknowledgment packet that acknowledges receipt of all data bytes through X7, and indicates that the next expected data byte is X7+1. Since TCP acknowledgments are cumulative, WCD 500 can transmit just this one generated acknowledgment packet to effectively acknowledge all data bytes received so far on this communication session.

Thus, at step 558, WCD 500 transmits the acknowledgment packet generated at step 556. As was the case for the embodiment of FIG. 5B, instead of transmitting three acknowledgment packets, only one is transmitted. This also reduces the amount of transmitted acknowledgment packets by two-thirds. The operations depicted in FIG. 5C may take place, for instance, in acknowledgment management module 414 (at the transport layer), or in a module located elsewhere in a network protocol stack or a WCD.

The behavior of WCD 500 may change between that of FIG. 5A and FIG. 5C based on variations in the amount of carrier aggregation used by the WCD. When WCD 500 is in the mode depicted in FIG. 5C, WCD 500 may refrain from generating anywhere from 2, 4, 8, 16, etc., acknowledgment packets before generating a cumulative acknowledgment packet. The number of acknowledgment packets that WCD 500 refrains from generating may be based on the amount of carrier aggregation used by WCD 500. For instance, when the amount of carrier aggregation increases, WCD 500 may begin generating fewer acknowledgment packets, and the number of acknowledgment packets generated when in this mode may decrease with the amount of carrier aggregation. Conversely, when the amount of carrier aggregation decreases, WCD 500 may generate relatively more acknowledgment packets, and/or might not refrain from generating acknowledgment packets.

Furthermore, the embodiments of FIGS. 5B and 5C may be combined such that a WCD subject to an increase in carrier aggregation both refrains from generating some acknowledgment packets, and also queues then discards some of the acknowledgment packets that it does generate.

Regarding the embodiments of either FIG. 5B or 5C, acknowledgment management module 412 and/or acknowledgment management module 414 may incorporate a timer to release queued acknowledgment packets should those acknowledgment packets remain queued for more than a threshold period of time.

For instance, suppose that acknowledgment management module 412 is configured to queue up to three acknowledgment packets. When acknowledgment management module 412 queues the first of these three acknowledgment packet, it may start a timer. Once acknowledgment management module 412 has three queued acknowledgment packets, it may select one of these (e.g., the most recently received acknowledgment packet) for transmission, and may discard the remaining two, then reset the timer.

However, if the WCD receives data packets such that only one or two acknowledgment packets are generated and queued, acknowledgment management module 412 might delay transmission of any queued acknowledgment packets while it waits for more acknowledgment packets to be generated. In some cases, this delay may be one or more seconds, which could potentially disrupt the flow of the communication session.

Therefore, the timer may be configured with a value of, for example, 200 milliseconds, 300, milliseconds, or 500 milliseconds (other timer values may be used). If the timer expires and there are acknowledgment packets queued for the communication session, acknowledgment management module 412 may select one of these (e.g., the most recently received acknowledgment packet) for transmission, and may discard the remaining two, then reset the timer. Alternatively, acknowledgment management module 412 may transmit more than one, or all, of the queued acknowledgment packets. In doing so, any deleterious impact on the communication session due to queued acknowledgment packets may be mitigated.

Figure 6:
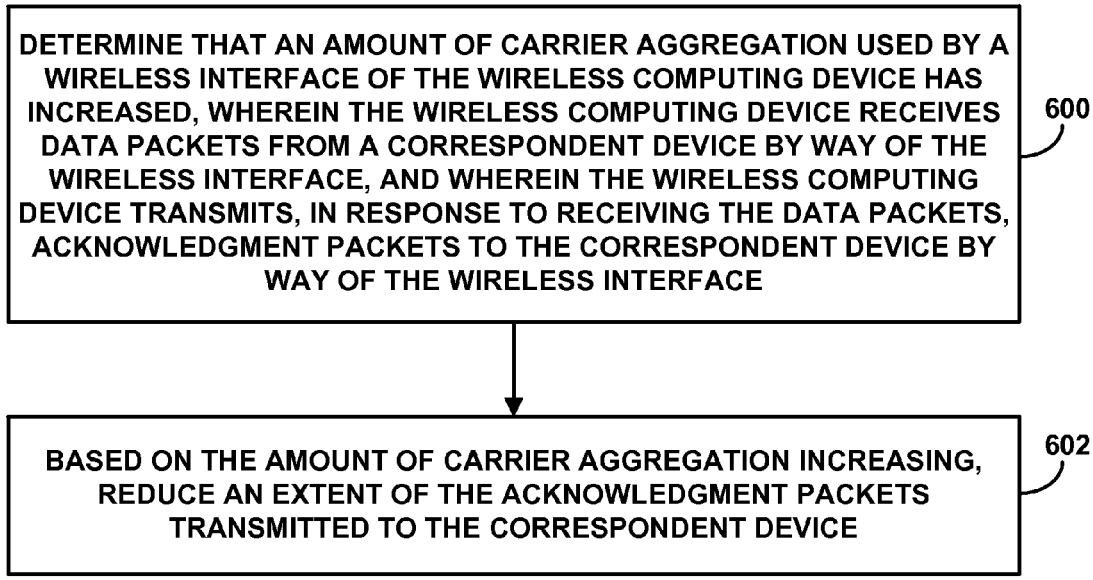
FIG. 6 is a flow chart, in accordance with example embodiments.

FIG. 6 is a flow chart in accordance with example embodiments. The operations illustrated by this flow chart may be carried out by a WCD, such as WCD 120, WCD 124, and/or WCD 500. These operations may be used with any of the frequency arrangements of FIG. 3A or 3B, with any of the protocol stacks of FIG. 4, and/or with any of the acknowledgment strategies of FIGS. 5A, 5B, and 5C. Nonetheless, as the embodiments disclosed herein are examples, the operations of FIG. 6 may be used with other frequency arrangements and/or protocol stacks.

Block 600 may involve determining that an amount of carrier aggregation used by a wireless interface of a WCD has increased. The WCD may receive data packets from a correspondent device by way of the wireless interface, and the WCD may transmit, in response to receiving the data packets, acknowledgment packets to the correspondent device by way of the wireless interface. Block 602 may involve, possibly based on the amount of carrier aggregation increasing, reducing an extent of the acknowledgment packets transmitted to the correspondent device. In some embodiments, the acknowledgment packets do not contain application data.

The amount of carrier aggregation may be proportional to a number of carrier frequencies on which the wireless computing device receives the data packets. Determining that the amount of carrier aggregation has increased may involve determining that a number of carrier frequencies used by the wireless interface has increased from one to more than one. The amount of carrier aggregation may increase in the downlink direction but not in the uplink direction. Thus, in some embodiments, the WCD may transmit the acknowledgment packets on only one carrier frequency. Therefore, determining that the amount of carrier aggregation used by the WCD has increased may further involve determining that a number of carrier frequencies on which the wireless computing device transmits the acknowledgment packets has remained at one.

In some embodiments, the data packets are TCP data packets, and the acknowledgment packets are TCP acknowledgment packets. Reducing the extent of acknowledgment packets transmitted to the correspondent device may take place in a TCP module of the WCD. Alternatively or additionally, reducing the extent of acknowledgment packets transmitted to the correspondent device may take place outside of a TCP module of the WCD.

In some embodiments, reducing the extent of acknowledgment packets transmitted to the correspondent device may involve (i) determining that n acknowledgment packets are queued for transmission to the correspondent device, where n is at least 2, and (ii) discarding m of the n queued acknowledgment packets, wherein m is greater than 0 and less than n. Alternatively or additionally, reducing the extent of acknowledgment packets transmitted to the correspondent device may involve (i) determining that n acknowledgment packets are queued for transmission to the correspondent device, where n is at least 2, and (ii) discarding all of the n queued acknowledgment packets except for a most-recently queued acknowledgment packet. Alternatively or additionally, the WCD may be configured to transmit 1 acknowledgment packet for every k data packets received, and reducing the extent of acknowledgment packets transmitted to the correspondent device may involve increasing k. As an example, k may be increase from 1 or 2 to 4, 8, 16, or some other value.

Some embodiments may further involve (i) determining that the amount of carrier aggregation used by the wireless interface of the wireless computing device has decreased, and (ii) possibly based on the amount of carrier aggregation used by the wireless computing device decreasing, increasing the extent of the acknowledgment packets transmitted to the correspondent device.

6. Conclusion

The present disclosure is not to be limited in terms of the particular embodiments described in this application, which are intended as illustrations of various aspects. Many modifications and variations can be made without departing from the scope of these embodiments, as will be apparent to those skilled in the art. Functionally equivalent methods and apparatuses, in addition to those enumerated herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein. For instance, more or fewer of each element shown in a given figure, may be present, and some of the illustrated elements can be combined or omitted. Yet further, example embodiments can include elements that are not illustrated in the figures.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrent or in reverse order, depending on the functionality involved. Further, more or fewer blocks and/or operations can be used with any of the message flow diagrams, scenarios, and flow charts discussed herein, and these message flow, scenarios, and flow charts can be combined with one another, in part or in whole.

A step or block that represents a processing of information can correspond to circuitry that can be configured to perform the specific logical operations of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

Thus, the various aspects and embodiments disclosed herein are for purposes of illustration and are not intended to be limiting, with their true scope being indicated by the following claims.

What is claimed is:

1. A method comprising:
   determining, by a wireless computing device, that an amount of carrier aggregation used by a wireless interface of the wireless computing device has increased, wherein the wireless interface communicatively couples the wireless computing device to a radio access network (RAN) device, wherein the wireless computing device receives transmission control protocol (TCP) data packets from a correspondent device by way of the RAN device and the wireless interface, and wherein the wireless computing device transmits, in response to receiving the TCP data packets, TCP acknowledgment packets to the correspondent device by way of the wireless interface; and
   in response to the amount of carrier aggregation increasing, reducing, by the wireless computing device, generation of a number of the TCP acknowledgment packets transmitted to the correspondent device.

2. The method of claim 1, wherein the amount of carrier aggregation is proportional to a number of carrier frequencies used by the wireless interface.

3. The method of claim 1, wherein determining that the amount of carrier aggregation has increased comprises determining that a number of carrier frequencies used by the wireless interface has increased from one to more than one.

4. The method of claim 3, wherein the wireless computing device transmits the TCP acknowledgment packets on one carrier frequency, and wherein determining that the amount of carrier aggregation used by the wireless computing device has increased further comprises determining that a number of carrier frequencies on which the wireless computing device transmits the TCP acknowledgment packets has remained at one.

5. The method of claim 1, wherein reducing generation of the number of TCP acknowledgment packets transmitted to the correspondent device takes place in a TCP module of the wireless computing device.

6. The method of claim 1, wherein reducing generation of the number of TCP acknowledgment packets transmitted to the correspondent device comprises increasing a number of received TCP data packets acknowledged by each generated TCP acknowledgement packet.

7. The method of claim 1, wherein the TCP acknowledgment packets do not contain application data.

8. The method of claim 1, further comprising:
   determining that the amount of carrier aggregation used by the wireless interface of the wireless computing device has decreased; and
   based on the amount of carrier aggregation used by the wireless computing device decreasing, increasing generation of the number of the TCP acknowledgment packets transmitted to the correspondent device.

9. An article of manufacture including a non-transitory computer-readable medium, having stored thereon program instructions that, upon execution by a wireless computing device, cause the wireless computing device to perform operations comprising:
   determining that an amount of carrier aggregation used by a wireless interface of the wireless computing device has increased, wherein the wireless interface communicatively couples the wireless computing device to a radio access network (RAN) device, wherein the wireless computing device receives transmission control protocol (TCP) data packets from a correspondent device by way of the RAN device and the wireless interface, and wherein the wireless computing device transmits, in response to receiving the TCP data packets, TCP acknowledgment packets to the correspondent device by way of the wireless interface; and
   in response to the amount of carrier aggregation increasing, reducing generation of a number of the TCP acknowledgment packets transmitted to the correspondent device.

10. The article of manufacture of claim 9, wherein the amount of carrier aggregation is proportional to a number of carrier frequencies used by the wireless interface.

11. The article of manufacture of claim 9, wherein determining that the amount of carrier aggregation has increased comprises determining that a number of carrier frequencies used by the wireless interface has increased from one to more than one.

12. The article of manufacture of claim 9, wherein reducing generation of the number of TCP acknowledgment packets transmitted to the correspondent device comprises increasing a number of received TCP data packets acknowledged by each generated TCP acknowledgement packet.

13. The article of manufacture of claim 9, wherein the TCP acknowledgment packets do not contain application data.

14. The article of manufacture of claim 9, wherein reducing generation of the number of TCP acknowledgment packets transmitted to the correspondent device takes place in a TCP module of the wireless computing device.

15. The article of manufacture of claim 9, wherein the operations further comprise:
- determining that the amount of carrier aggregation used by the wireless interface of the wireless computing device has decreased; and
- based on the amount of carrier aggregation used by the wireless computing device decreasing, increasing generation of the number of the TCP acknowledgment packets transmitted to the correspondent device.

16. A wireless computing device comprising:
- at least one processor;
- memory; and
- program instructions, stored in the memory, that upon execution by the at least one processor cause the wireless computing device to perform operations comprising:
  - determining that an amount of carrier aggregation used by a wireless interface of the wireless computing device has increased, wherein the wireless interface communicatively couples the wireless computing device to a radio access network (RAN) device, wherein the wireless computing device receives transmission control protocol (TCP) data packets from a correspondent device by way of the RAN device and the wireless interface, and wherein the wireless computing device transmits, in response to receiving the TCP data packets, TCP acknowledgment packets to the correspondent device by way of the wireless interface; and
  - in response to the amount of carrier aggregation increasing, reducing generation of a number of the TCP acknowledgment packets transmitted to the correspondent device.

17. The wireless computing device of claim 16, wherein the amount of carrier aggregation is proportional to a number of carrier frequencies used by the wireless interface.

18. The wireless computing device of claim 16, wherein reducing generation of the number of TCP acknowledgment packets transmitted to the correspondent device takes place in a TCP module of the wireless computing device.

19. The wireless computing device of claim 16, wherein reducing generation of the number of TCP acknowledgment packets transmitted to the correspondent device comprises increasing a number of received TCP data packets acknowledged by each generated TCP acknowledgement packet.

20. The wireless computing device of claim 16, wherein the operations further comprise:
- determining that the amount of carrier aggregation used by the wireless interface of the wireless computing device has decreased; and
- based on the amount of carrier aggregation used by the wireless computing device decreasing, increasing generation of the number of the TCP acknowledgment packets transmitted to the correspondent device.

* * * * *